United States Patent [19]

Fearnside

[11] 4,455,578
[45] Jun. 19, 1984

[54] ELECTRONICS FOR ARRAYED PHOTOSOURCES

[75] Inventor: William T. Fearnside, Fishers, N.Y.

[73] Assignee: Eastman Kodak Company, Rochester, N.Y.

[21] Appl. No.: 413,013

[22] Filed: Aug. 30, 1982

[51] Int. Cl.³ ............................................. H04N 1/24
[52] U.S. Cl. .............................. 358/302; 346/107 A; 358/293; 358/294; 358/240; 358/241
[58] Field of Search ............... 358/293, 294, 302, 240, 358/241; 346/107 A

[56] References Cited

U.S. PATENT DOCUMENTS

| | | | |
|---|---|---|---|
| 3,740,570 | 6/1973 | Kaelin et al. | 307/40 |
| 4,021,607 | 5/1977 | Amano | 358/230 |
| 4,074,318 | 2/1978 | Kapes, Jr. | 358/230 |
| 4,074,319 | 2/1978 | Goldschmidt et al. | 358/230 |
| 4,074,320 | 2/1978 | Kapes, Jr. | 358/230 |

OTHER PUBLICATIONS

"Variable Resolution Linear Array Scanner", by A. J. Dattilo and M. C. Nielson, IBM Technical Disclosure Bulletin, vol. 22, No. 6, Nov. 1979, p. 2250.

*Primary Examiner*—Howard W. Britton
*Attorney, Agent, or Firm*—Raymond L. Owens

[57] ABSTRACT

Regarding any given light source in an array thereof, apparatus according to the invention comprises a shift register adapted to store bits corresponding to the ON times for the light source. The output of the shift register is applied to the light source and, when a ONE bit occurs at the shift register output concomitantly with the application to the light source of a pulse from a train thereof, the light source turns ON. The pulses in the train thereof are of binary weighted durations. By making the duty cycle of at least the 2° pulse of the pulse train fairly low, and by employing a secondary pulse train to effect shifting of bits within the register simultaneously with, or before, the occurrence of the binary weighted pulses, the maximum shift frequency within the shift register—as opposed to that which would be required by prior art apparatus that employs a bit weighted clock for shifting within the register—is lessened appreciably.

14 Claims, 8 Drawing Figures

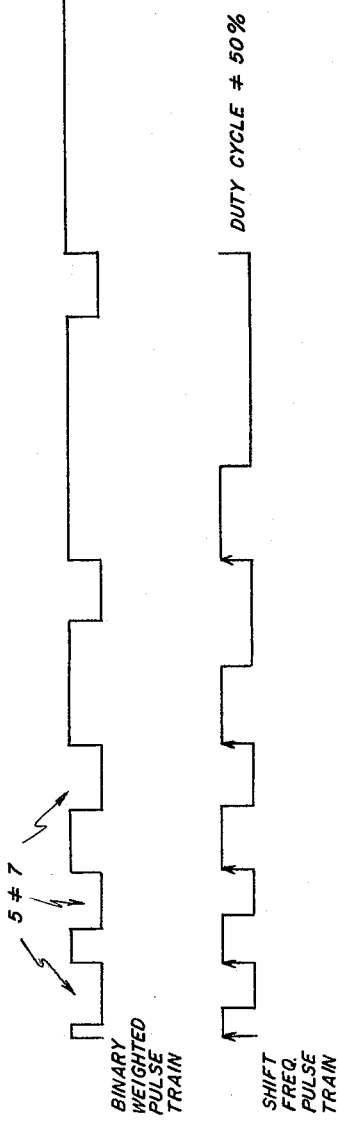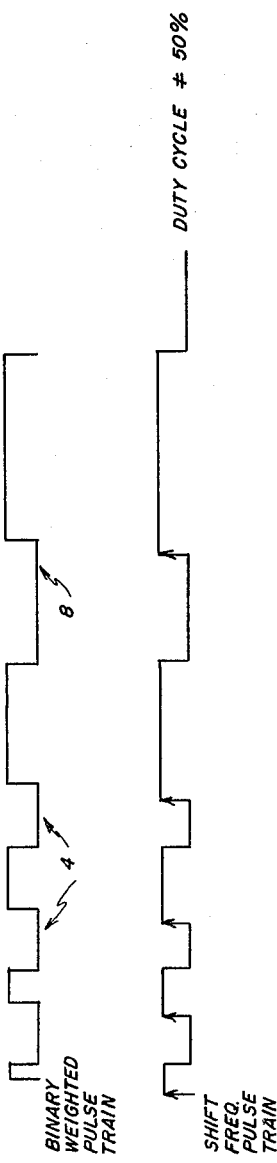

ELECTRONICS FOR ARRAYED PHOTOSOURCES

BACKGROUND OF THE INVENTION (1) Field of the Invention

This invention relates in general to apparatus for exposing a photosensitive web by means of a linear array of light sources and, in particular, to improved electronics for actuating the individual light sources of such array.

The invention, as well as the prior art, will be described with reference to the figures of which FIG. 1 is a perspective view illustrating the general arrangement of prior art apparatus improved by means of the invention, FIG. 2 is a schematic block diagram illustrating prior art signal processing apparatus useful with the apparatus of FIG. 1, FIG. 3 is a view showing a set of waveform diagrams useful in explaining the operation of the prior art apparatus of FIG. 2, FIG. 4 is a schematic block diagram illustrating apparatus according to the invention, FIG. 5 is a view showing a set of waveform diagrams useful in explaining the operation of the apparatus of FIG. 4, FIGS. 6 and 7 are views illustrating waveform diagrams corresponding to alternative forms of the invention, and FIG. 8 is a schematic block diagram illustrating a circuit useful in the practice of the invention.

(2) Description Relative to the Prior Art

The environment for the herein disclosed invention is typified by the diagram of FIG. 1: an array 10 of 640 triggerable light sources—e.g. light emitting diodes (LED's)—is disposed to expose selectively a photosensitive image-receiver medium 12 that is movable in relation to the array. The LED's of the array 10 are triggered into operation by means of image processing electronics 14 that are responsive to image signal information. Depending on the duration for which any given LED is turned on, the exposure effected by such LED is more or less made. Variable tone images may therefore be produced in the receiver medium 12 by processing the LED's into operation, as necessary, to expose various picture elements (pixels) within the receiver medium.

U.S. Pat. No. 4,074,319 discloses apparatus such as that of FIG. 1 and teaches that exposure of pixels by means of LED's may be by use of respective successions of pulses. Typically, the duration of such pulses would be binary encoded. Thus, for exposure of three adjacent pixels to exposure levels of, say, 1, 2, and 5, respectively, the first LED would turn ON for a duration equal to "1"; the second LED would turn ON for a duration twice as long as the ON time of the first LED, i.e. for a duration equal to "2"; and the third LED would turn ON for a duration equal to that of the first, then turn OFF, and then turn back ON for a duration twice as long as the duration of the second LED, i.e. 1+4=5.

The apparatus of FIG. 2 follows the teaching of U.S. Pat. No. 4,074,319 and, as such, embodies a problem solved by means of the invention. Referring therefore to FIG. 2, 10 subarrays of LED's 16a–16j are disposed to form a linear array of 640 LED's. Each subarray is like each other and, so, only the details of the subarray 16a, and its cooperating control assembly electronics 22a, are shown.

As digitized (14 bit bytes) image signals are periodically derived from a data source 18 (magnetic tape, frame store, etc.) 4 bits thereof from each byte are processed (under overall control of a sequence controller 19) by a subarray select decoder 20 to select which of the control assemblies 22a–22j is to receive the 10 image information bits of the byte. Assuming that the first control assembly 22a has been selected by the decoder 20, the image information bits that were associated with the composite (14 bit) image signal are applied, via latches 24, to a high speed parallel multiplier 26b—e.g. an MPY-12 multiplier available from TRW, Inc.—the purpose of which is to provide a means for multiplying the 10 bit image data words by a correction factor indicative of the variability between individual LED's within the subarray 16a–16j; simultaneously the LED address counter 27 presents the 6 bit address of the selected LED to a 64 byte by 10 bit memory 26a. The memory 26a—in response to its 6 bit input address—places on its 10 bit output bus the stored correction factor for the selected LED, whereby the image byte appearing at the output of the latches 24 will be corrected. Thus, in response to a load clock applied to the data latches 24, the 10 image information data bits which originate with the source 18 are relatively instantly transformed and applied as corrected data to a 10-stage, parallel-in/serial-out, shift register 28. (Although the components 26a,26b form no part of the invention, reference is made hereto in the interest of illustrating preferred signal processing.)

Image information bits which are applied to the 10-stage shift register 28 are serially clocked out of such shift register by means of a load clock applied via an AND gate 30 that is enabled in response to the decoded output of the subarray select decoder 20. As image information bits exit the shift register 28, they are serially loaded into a 630 stage shift register 32 by means of the load clock, the load clock being applied to the shift register 32 via the OR gate 34. (Although, as shown, the shift register 28 output is also applied to the first of the 64 LED drivers—38a—in an array thereof, such is of no effect in the absence of a print enable signal supplied by the sequence controller 19.) Therefore, in succession, the combination of shift registers 28 and 32 of each control assembly 22a–22j are loaded with 64 10-bit image information bytes apiece: 63 bytes in the shift registers 32 and 1 byte in the shift registers 28.

With image information bits loaded into the shift registers 28,32 of each of the 10 control assemblies 22, a print enable signal is then applied to each driver 38a–38j of all such assemblies 22. Thereafter, or simultaneously therewith, a binary weighted frequency clock, produced by a circuit 40, is applied by a respective OR gates 34 to the respective registers 28,32 of the assemblies 22, thereby to actuate the 640 linearly arrayed LED's for respective series of binary weighted durations. In this way, an image line 640 pixels wide, is exposed into the image receiving medium 12 (FIG. 1).

Referring again specifically to the control assembly 22a and its cooperating LED subarray 16a, the first bit (i.e. the bit in stage 10 of the shift register 28) out of the register 28—after "print enable"—is applied to the driver 38a (associated with the LED #∅) simultaneously with the application of the bits in the 10th, 20th, etc. stages of the shift register 32, respectively, to the drivers 38b, 38c, etc.; then, the second bit (i.e. the bit that was originally in stage 9 of the shift register 28), after being shifted to the output of the register 28, is applied to the driver 38a simultaneously with the application of shifted bits (which were originally in stages 9, 19, etc.) within the register 32 to the drivers 38b, 38c, etc.

Reference should now be had to FIG. 3 which shows the nature of the weighted frequency clock, the print enable waveform, and three LED drive signals corresponding to image exposure data of 0000000001=1, 0000010110=22 and 0000111111=63. Given, for example, that the shift register 28 stores the binary equivalent of decimal 1, and that the first and second 10-stage groupings of the shift register 32 store respectively the binary equivalents of decimal 22 and 63, note what occurs in connection with "enabled" LED's #∅, #1 and #2: In response to the leading edge of the 2° pulse of the weighted frequency clock, the LED's #∅ and #2 turn ON, i.e. the 10th stage of the register 28 and the 20th stage of the register 32 contain ONE's. The LED #∅ remains ON until the leading edge of the $2^1$ pulse occurs, at which time it extinguishes. The LED #2, however, continues to remain ON after the LED #∅ extinguishes because the 20th stage of the shift register 32, after shifting, still contains a ONE bit. Similarly, even though the 10th stage of the shift register 32 had originally contained a ZERO bit, after shifting, it also contains a ONE bit, whereby it causes the LED #1 to turn ON. In this way, the LED's in the subarrays 16a–16j are turned ON and OFF (at high rates) to effect varied exposure of the lines of an image exposed into the image receiver medium 12.

Problem

With 640 linearly arrayed LED's the number of lead lines (to the LED's, and elsewhere) which are necessary is extensive; and, needless to say, in the event the lineal density of the LED's were to be still greater, thereby to effect imaging of even greater resolution, the lead-line concern would exacerbate. There is, therefore, great impetus to employ very large scale integrated (VLSI) solid state electronics in connection with arrayed LED's, whereby a mishmash of wiring can be avoided.

VLSI electronics, at the current state of the art, are limited in band width and package power dissipation, which factors are interrelated . . .

Assuming a line exposure time (print enable) for the system of FIG. 2 of 40 microseconds, note what this means in terms of the frequency at which the shift registers 28 and 32 must operate: To clock out 10 image information bits from either the register 28 or 32, 10 binary weighted clock pulses are required. Therefore, the time to clock out the 10 image information bits is 1023 time increments, i.e. $2°+2^1+2^2+ \ldots 2^{10}=1023$. Given the aforesaid 40 microsecond print time, this means that each time increment is 40 microseconds/1023=39 nanoseconds; and, corollarily, the frequency that corresponds to an incremental period of 39 nanoseconds is 1/39 nanoseconds=25.6 MHz . . . a frequency entirely too high, and accordingly not practicable, for operation of the shift registers 28, 32 when embodied in VLSI electronics.

Intrinsic to a weighted frequency clock is the fact that each pulse thereof has a 50 percent duty cycle: for each ON time associated with any given pulse, there is an OFF time of equal duration. Thus, from FIG. 3, it is quite apparent that the frequency $f_1$ associated with the ON-OFF time of the 2° bit directly corresponds to the uppermost frequency associated with the weighted frequency clock. While it might be suggested that the aforesaid frequency demands might be relaxed by doubling both the ON and OFF times of the 2° bit, such a tack is (ordinarily) not viable because it would undesirably necessitate a doubling of the line exposure time (print enable).

SUMMARY OF THE INVENTION

Problem Solution

Regarding any given light source in an array thereof, apparatus according to the invention comprises a shift register adapted to store bits corresponding to the ON times for the light source. The output of the shift register is applied to the light source and, when a ONE bit occurs at the shift register output concomitantly with the application to the light source of a pulse from a train thereof, the light source turns ON. The pulses in the train thereof are of binary weighted durations. By making the duty cycle of at least the 2° pulse of the pulse train fairly low, and by employing a secondary pulse train to effect shifting of bits within the register simultaneously with, or before, the occurrence of the binary weighted pulses, the maximum shift frequency within the shift register—as opposed to that which would be required by prior art apparatus that employs a bit weighted clock for shifting within the register—is lessened appreciably. How and why this is so will be better appreciated from a detailed description of the invention, which appears below.

DETAILED DESCRIPTION OF THE INVENTION

Figure 1:
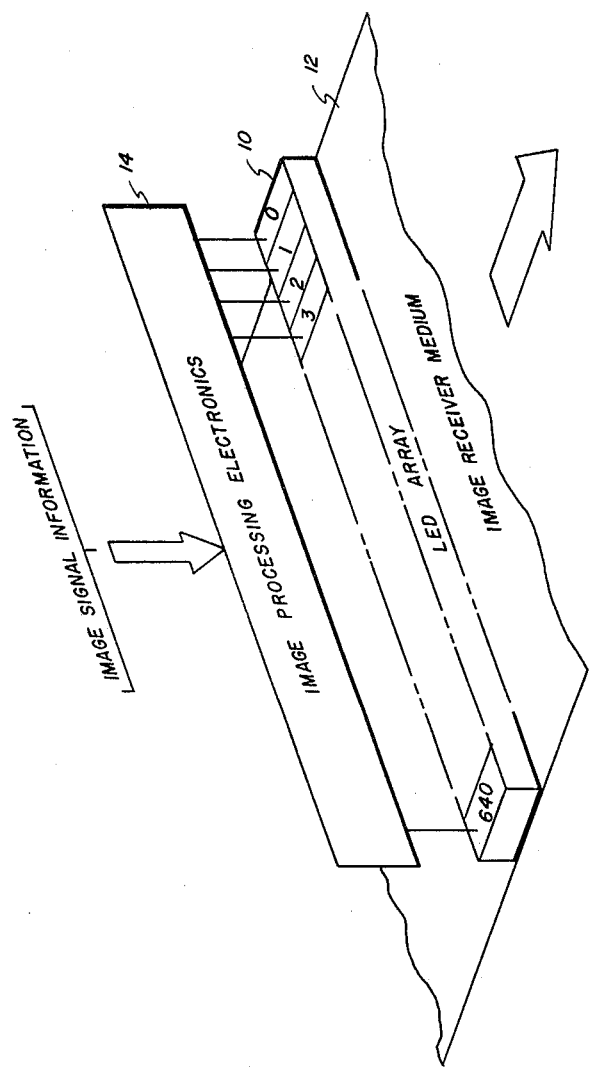
Figure 2:
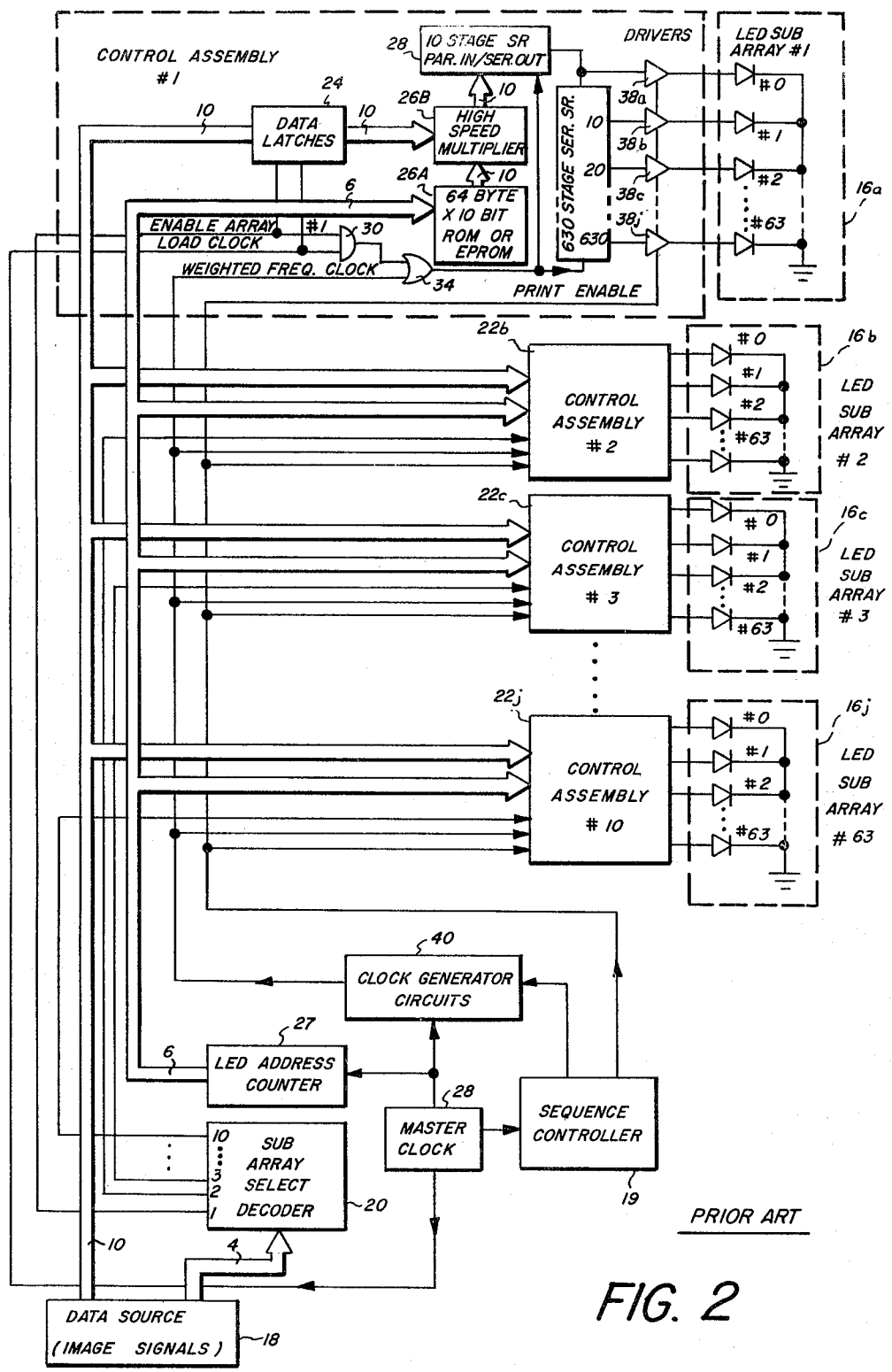
Figure 4:
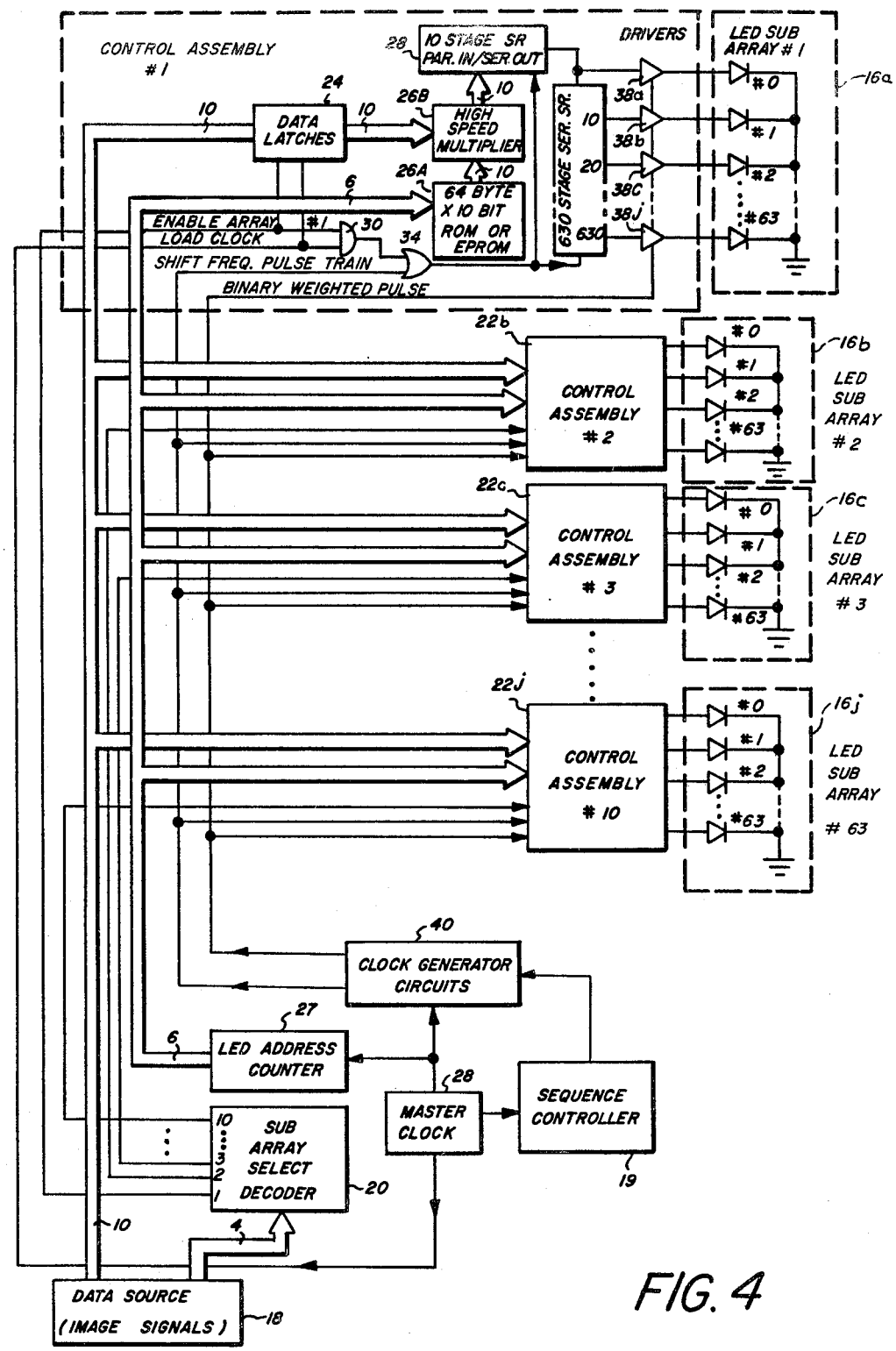
Figure 5:
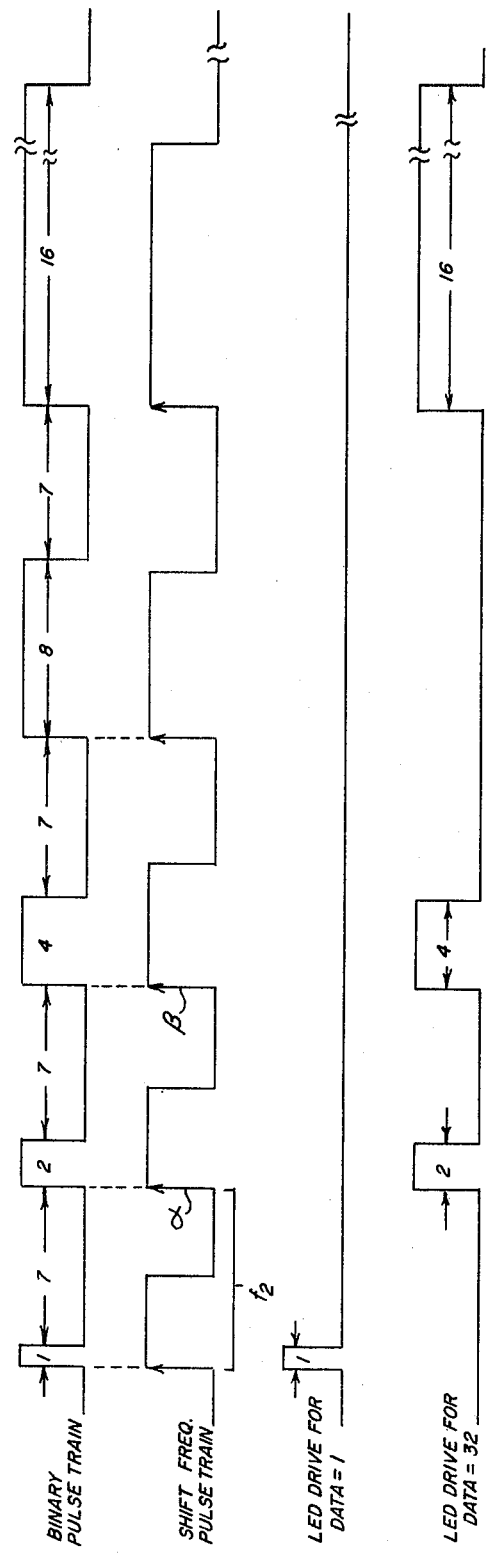

Referring to FIG. 4, it will be noted that structurally the apparatus thereof is very similar to that of FIG. 2, save for the substitution of (1) a new binary weighted pulse train for the former print enable signal and (2) and a new shift frequency pulse train for the former weighted frequency clock (see FIG. 5). In all other aspects, the apparatus of FIGS. 2 and 4 are essentially identical. Accordingly, the corresponding component parts of FIGS. 2 and 4 are provided with the same character numbers; and similarly indicated, but primed, notation is employed to identify related, but different, component hardware.

To explain the exposure of a 640 pixel image line by means of the apparatus of FIG. 4, the discussion which follows will dwell on the operation of the control assembly #1, it being understood that all control assemblies, regardless of the image information bits which they store in their respective registers, operate in identically the same way. Given that, in response to the load clock, the registers 28, 32 of the control assembly #1 are fully loaded with image information ONE's and ZERO's, the binary weighted pulse train is applied to all of the drivers 38 for the 64 LED's #∅–#63. If a ONE bit exists at, for example, the output stage of the shift register 28 and at the 10th stage of the shift register 32, the LED's #∅ and #1 are turned on for a duration corresponding to a time increment of "1", as indicated in the binary weighted pulse train of FIG. 5. After (in this example) an incremental time duration of "7", a pulse having an incremental time duration of "2" is applied to all of the drivers 38. Approximately simultaneously with, i.e. just before, the application of the "2-duration" pulse to the drivers 38, the positive-going edge (a) of a pulse in the shift frequency pulse train shifts the registers 28, 32 to cause a new bit to appear at the output of the shift register 28 and at the stages 10, 20, 30, etc. . . . of the shift register 32. Assuming now that the output of the shift register 28, and the 20th and 30th stages of the shift register 32, contain image information data ONE bits, the LED's #0, #2 and #3 turn ON for an incremental time duration of "2". Then, again after an incremental time duration of "7", the positive-going edge ($\beta$) of the next shift frequency pulse shifts the register 28, 32 to cause a new set of bits to appear at the output of the shift register 28 and at the output stages 10, 20, 30 etc. of the shift register 32, whereby (depending on the occurrence of ONE bits at the respective stages) the LED's in question now turn ON for an incremental time duration of "4" (and so on), the last pulse of the binary weighted pulse train, before successive repeats, being of a duration corresponding to $2^{10}$. Maximum exposure of any given pixel (all ONE's applied to an LED driver), therefore, is for 1023 time increments (albeit that these time increments, as will be discussed below, are slightly different from those indicated in connection with FIG. 2).

Representative LED drive signals corresponding to stored shift register image information data of 0000000001=1 and 0000010110=22 are depicted in FIG. 5.

Figure 3:
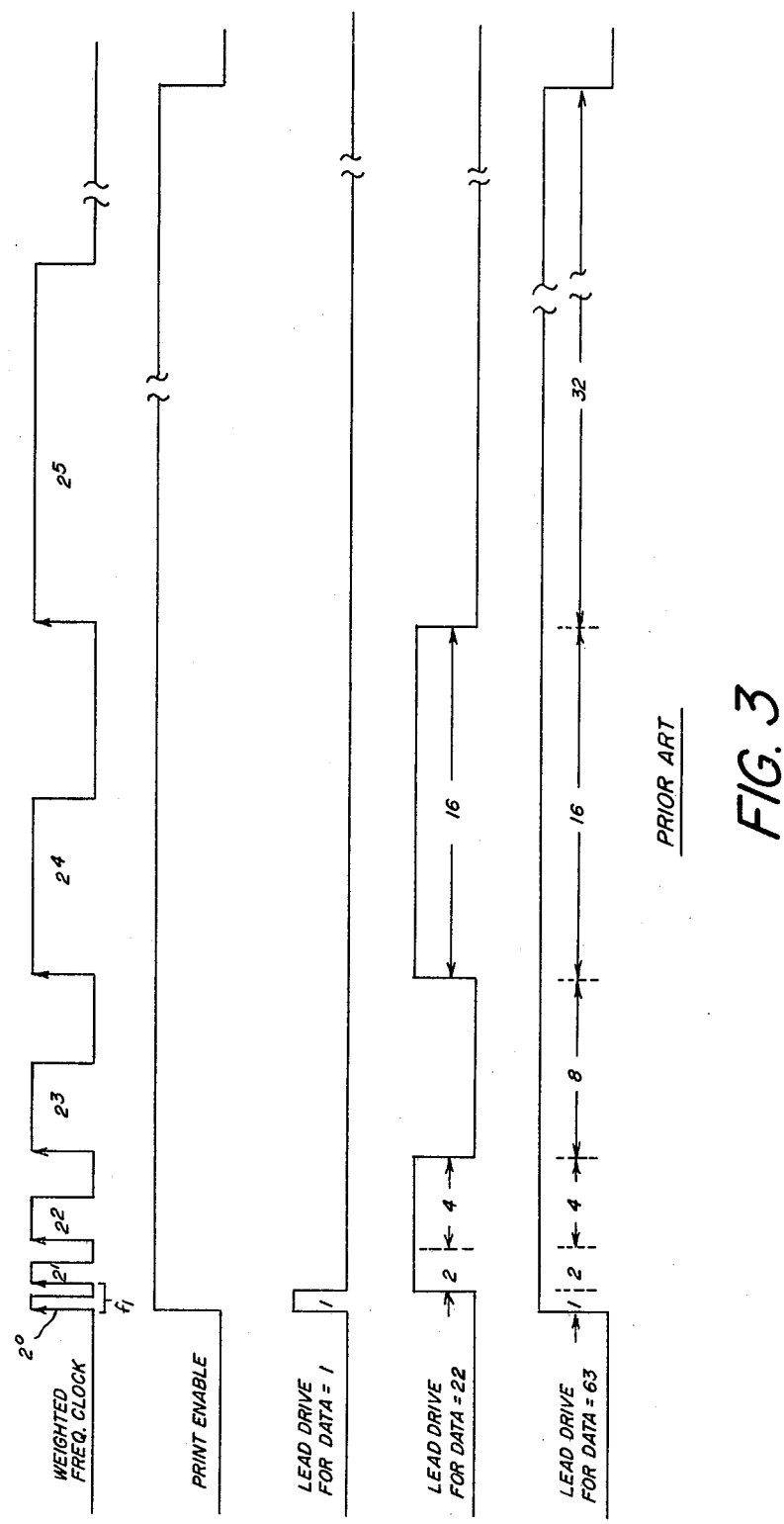

In the above description, it was stated that the OFF time between each of the pulses in the binary weighted pulse train was for an incremental time duration of "7". With an ON-to-OFF ratio of 1-to-7 for the $2°=1$ binary weighted pulse, the corresponding requisite shift frequency $f_2$ (assuming a 50 percent duty cycle for the first shift frequency pulse) is clearly much less than the problematical shift frequency $f_1$ of FIG. 3.

Approaching the above differently, and assuming again a 40 microsecond line exposure print time, the duration of the binary weighted pulse train to effect line exposure is $1023+10(7)=1093$ time increments. Similar to the above calculation for the frequency handling capability of the FIG. 2 apparatus, the duration of a single time increment is 40 microseconds/1093=36.6 nanoseconds. Given, for example, a 50 percent duty cycle for the shift frequency pulse train, this means that the period corresponding to the (shift) frequency $f_2$ is $(7+1)\times 36.6$ nanoseconds=293 nanoseconds . . . the frequency $f_2$ being 1/293 nanoseconds=3.42 MHz, a frequency easily practicable with VLSI electronics.

Whether the ON-to-OFF time of the binary weighted pulse train is 1-to-7, or whether the duty cycle of the shift frequency pulse train is 50 percent, is a matter of design preference. Indeed, as in FIGS. 6 and 7, variations according to the theme of the invention are illustrated. In FIG. 6, the binary weighted pulse train is depicted as having a constant 1-to-5 ON-to-OFF time; and the shift frequency pulse train is depicted as having a duty cycle of less than 50 percent. In FIG. 7, on the other hand, the ON-to-OFF time of the binary weighted pulse train is shown changing from 1-to-4 to 1-to-8; and the shift frequency pulse train—again less than 50 percent duty cycle—is shown disposed to effect switching within the registers "prior to" the occurrence of the binary weighted pulses.

Figure 8:
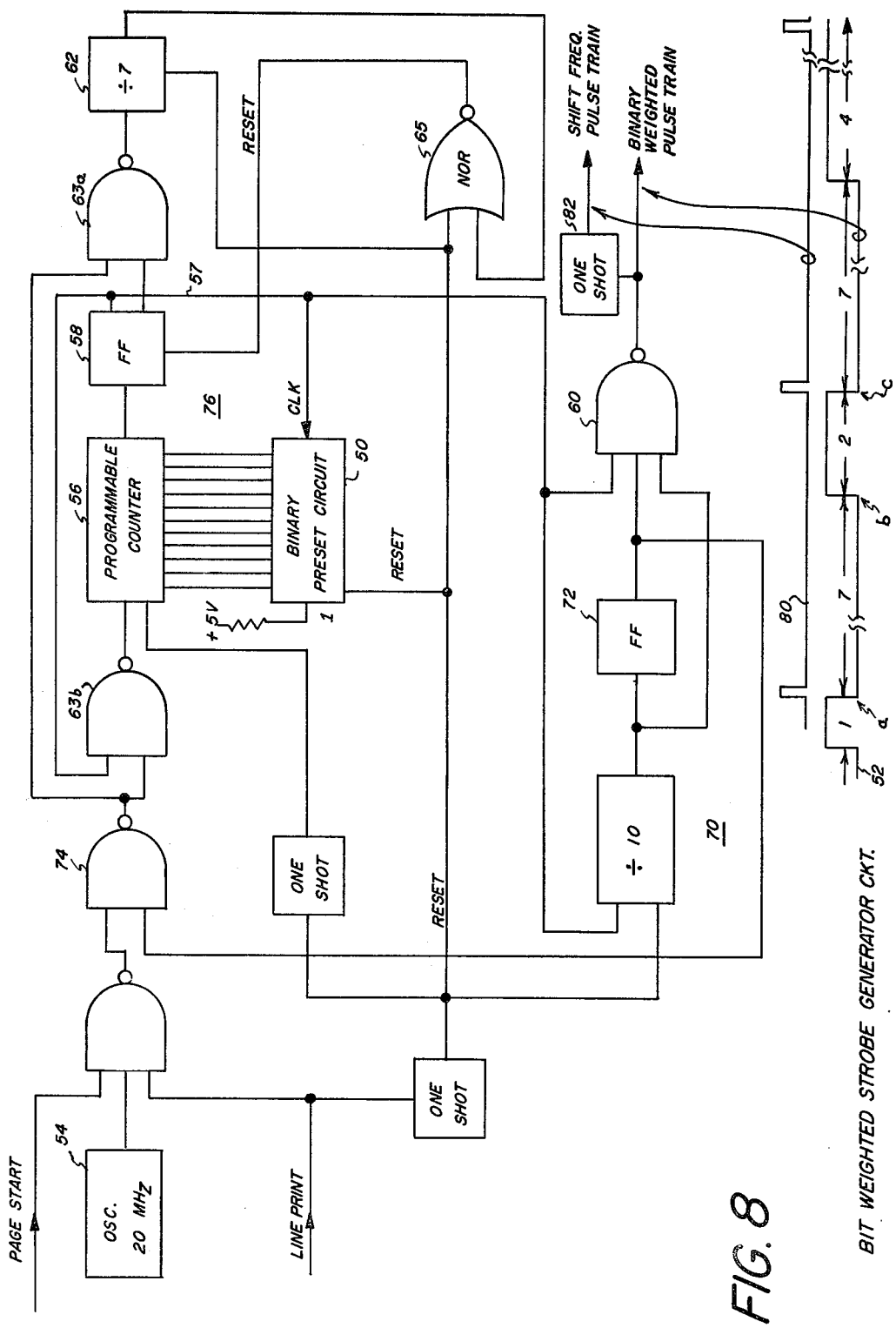

The design of circuit apparatus to produce pulse trains for implementing the invention is clearly within the skill of those in the art. While such circuit apparatus may take a variety of forms, FIG. 8 is presented in the interest of showing a particular circuit that has been employed in the practice of the invention:

Referring therefore to FIG. 8, a binary pre-set circuit (a register) 50 stores counts corresponding to binary weighted pulses in a train 52 thereof. As clock pulses, originating at an oscillator 54, get applied to a counter 56, the counter 56 counts to the first pre-set count of the circuit 50, at which time the counter causes the output (57) of a flip-flop 58 (that had been reset) to go LOW (a, 52), thereby causing the pre-set circuit 50 to select a new pre-set count. The output of the flip-flop 58, when applied via a gate 60, constitutes the binary weighted pulse train output (52) of the FIG. 8 circuit. Since the clock pulses are applied to a $\div 7$ circuit 62 (a gate 63a being opened while a gate 63b is closed), the circuit 62, via a gate 65, resets the flip-flop 58 to a HIGH state after 7 counts (b, 52). Then, the clock pulses again cause the counter 56 to count and, when a new pre-set count is reached, the flip-flop 58 output again goes LOW (c, 52), etc. There being 10 binary weighted pulses necessary for maximum exposure of any given pixel, a circuit 70 is provided to provide a pulse of 1023+70 time increments. Thus, when a flip-flop 72 of the circuit 70 operates a gate 74, the circuit (76) for producing the binary weighted pulse train is enabled; conversely, when the circuit 76 is not enabled, the shift registers 28, 32 of FIG. 4 are loaded with image information bit signals.

As was demonstrated above, the duty cycle of a pulse train for effecting shift register shifting need not be a 50 percent duty cycle; attendantly, the apparatus of FIG. 8 produces a shift frequency pulse train 80 from the trailing edges of the binary weighted pulses in the pulse train 52, utilizing a one shot 82 to this end.

The invention has been described in detail with particular reference to preferred embodiments thereof, but it will be understood that variations and modifications can be effected within the spirit and scope of the invention.

What is claimed is:

1. Apparatus comprising
   (a) actuable means,
   (b) shift register means for storing information in the form of digitized bits,
   (c) means for producing a pulse train, the pulses of which are weighted according to predetermined coding,
   (d) means for shifting said shift register means simultaneously with or before the occurrence of each pulse train pulse, and
   (e) means for receiving the output of said shift register means and the pulses of said pulse train for operating said actuable means in response to the concomitant receipt by said receiving means of a shift register bit and a pulse train pulse,
   whereby the minimal duty cycle of the pulses of said pulse train is determinative of the maximum frequency at which said shift register is required to shift.

2. The apparatus of claim 1 wherein (1) said actuable means is an actuable light source, and (2) said pulse train having predetermined coding is a pulse train of pulses having binary weighted durations.

3. The apparatus of claim 2 wherein said actuable light source is a light emitting diode.

4. In an optical printer comprised of a linear array of triggerable sources of radiation, and means for triggering selectively said radiation sources to effect selective exposure of a medium disposed to receive radiation from said sources, the improvement wherein said means for triggering is comprised of (a) first and second means for generating first and second pulse trains, (b) respective shift register means for said radiation sources, (c) means for applying digitized image information bit signals to said respective shift register means, and (d) respective means for actuating at least some of said radiation means, each said means for actuating being coupled to receive output bits from a respective shift register means and pulses from said first pulse train, thereby to actuate a respective radiation means in response to the concomitant receipt by said means for actuating of a shift register means output bit signal and a first pulse train pulse, said first pulse train pulses being for respective coded durations and said second pulse train pulses being applied to said shift register means to shift those means at the occurrence of, or before, each pulse of said first pulse train pulse.

5. The apparatus of claim 4 wherein (a) said radiation sources are light emitting diodes, and (b) said first pulse train pulses have respective binary weighted durations.

6. Apparatus for exposing a line of image information in a radiation responsive medium comprising (a) an array of radiation sources, (b) shift register means cooperative with each said source and adapted to receive image information bit signals, (c) means for producing a first pulse train for shifting said shift register means to advance the bit signals contained therein to the respective outputs of said shift register means, (d) means for producing a second pulse train comprised of pulses having respective coded durations, and (e) respective means responsive to a concomitant application thereto of the pulses of said second pulse train and output bit signals from said shift register means for actuating each said radiation source to expose a picture element in said radiation responsive means, the pulses of said first pulse train being disposed to produce shifting of said shift register means at times which are the same as, or before, the occurrence of corresponding pulses of said second pulse train, whereby the shift frequency of said shift register means is determined by the duration between the pulses of said second pulse train.

7. The apparatus of claim 6 wherein said radiation sources are light emitting diodes.

8. The apparatus of claim 7 wherein said pulses of said second pulse train have respective binary weighted durations.

9. Apparatus for printing line-by-line image information in a photosensitive medium, said apparatus comprising (a) a plurality of groupings of triggerable sources of radiation arranged in a row, (b) respective means for selectively controlling the triggering of the radiation sources of said groupings thereof, each said means for selectively controlling triggering comprising (1) shift register means for each radiation source within its corresponding grouping thereof, (2) means for applying image information bit signals to each of said shift register means, (3) means for producing a first pulse train comprised of pulses having respective coded durations, (4) respective means for driving the individual radiation sources of the grouping thereof, said means for driving being responsive to the concomitant application thereto of pulses of said first pulse train and output bits of respective shift register means, and (5) means for producing and applying a second pulse train to said shift register means to effect shifting of said shift register means prior to, or at the occurrence of, corresponding pulses of said first pulse train.

10. The apparatus of claim 9 wherein said radiation sources are light emitting diodes.

11. The apparatus of claim 10 wherein said first pulse train is comprised of pulses having binary weighted durations.

12. Apparatus for selectively controlling the triggering of sources of radiation in a grouping thereof comprising (a) shift register means for each radiation source in said grouping, (b) means for applying image information bit signals to each said shift register means, (c) means for producing a first pulse train comprised of pulses having respective coded durations, (d) respective means for driving the individual radiation sources of the grouping thereof, said means for driving being responsive to the concomitant application thereto of pulses of said first pulse train and output bits of respective shift register means, and (e) means for producing and applying a second pulse train to said shift register means to effect shifting of said shift register means prior to, or at the occurrence of, corresponding pulses of said first pulse train.

13. The apparatus of claim 12 wherein said radiation sources are light emitting diodes.

14. The apparatus of claim 13 wherein said first pulse train is comprised of pulses having binary weighted durations.

* * * * *